(12) United States Patent
Nishiyama et al.

(10) Patent No.: US 8,428,353 B2
(45) Date of Patent: Apr. 23, 2013

(54) CALCULATION APPARATUS FOR AMOUNT OF CHARACTERISTIC AND DISCRIMINATION APPARATUS

(75) Inventors: Manabu Nishiyama, Kanagawa-ken (JP); Tomoki Watanabe, Kanagawa-ken (JP); Masato Sumiyoshi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 13/223,646

(22) Filed: Sep. 1, 2011

(65) Prior Publication Data
US 2012/0057787 A1 Mar. 8, 2012

(30) Foreign Application Priority Data
Sep. 2, 2010 (JP) ................. P2010-196982

(51) Int. Cl.
*G06K 9/00* (2006.01)

(52) U.S. Cl.
USPC .......................................... 382/168; 382/170

(58) Field of Classification Search .................. 382/168, 382/170, 199, 224
See application file for complete search history.

(56) References Cited

U.S. PATENT DOCUMENTS

| | | | |
|---|---|---|---|
| 2011/0013805 A1* | 1/2011 | Okada et al. | 382/103 |
| 2011/0052050 A1* | 3/2011 | Cao et al. | 382/165 |
| 2012/0189193 A1* | 7/2012 | Overett et al. | 382/159 |

OTHER PUBLICATIONS

Masayuki Hiromoto, "Hardware Architecture for High-Accuracy Real-Time Pedestrian Detection with CoHOG Features," Proceedings of the 12th International Conference on Computer Vision Workshops, pp. 894-899 (2009).
Background Art Information Sheet provided by applicants (Jan. 26, 2011) (1 page total).

* cited by examiner

*Primary Examiner* — Phuoc Tran
(74) *Attorney, Agent, or Firm* — Posz Law Group, PLC

(57) ABSTRACT

A calculation apparatus for amount of characteristic that calculates an amount of characteristic based on a histogram of an amount of characteristic of input data includes: a buffer for holding a portion of the input data; a memory, having a plurality of banks, for holding calculation results of the histogram; a generation unit for generating a table in which a position of a target data on the buffer of which the amount of characteristic is to be calculated corresponds to a position on the memory to which a category of the calculated amount of characteristic is voted; and a vote unit that determines a category of the amount of characteristic of the target data and that performs a vote to the position on the memory shown on the table.

6 Claims, 11 Drawing Sheets

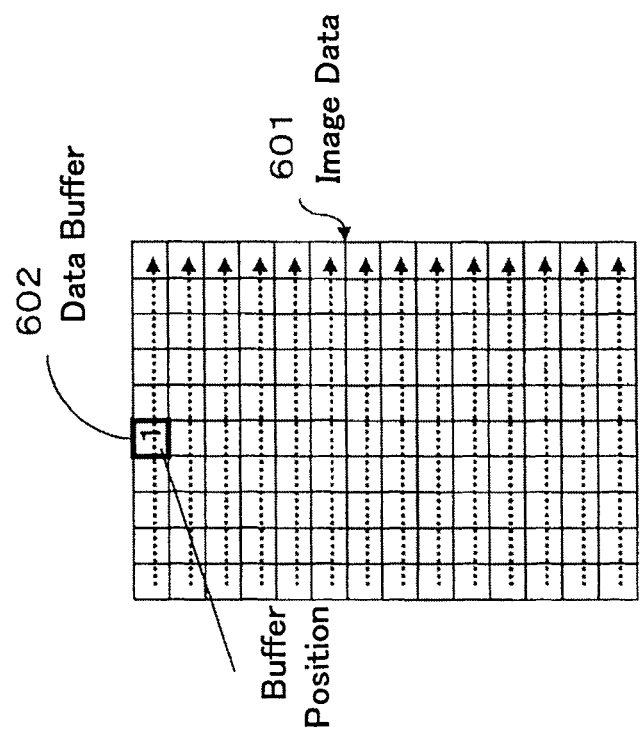

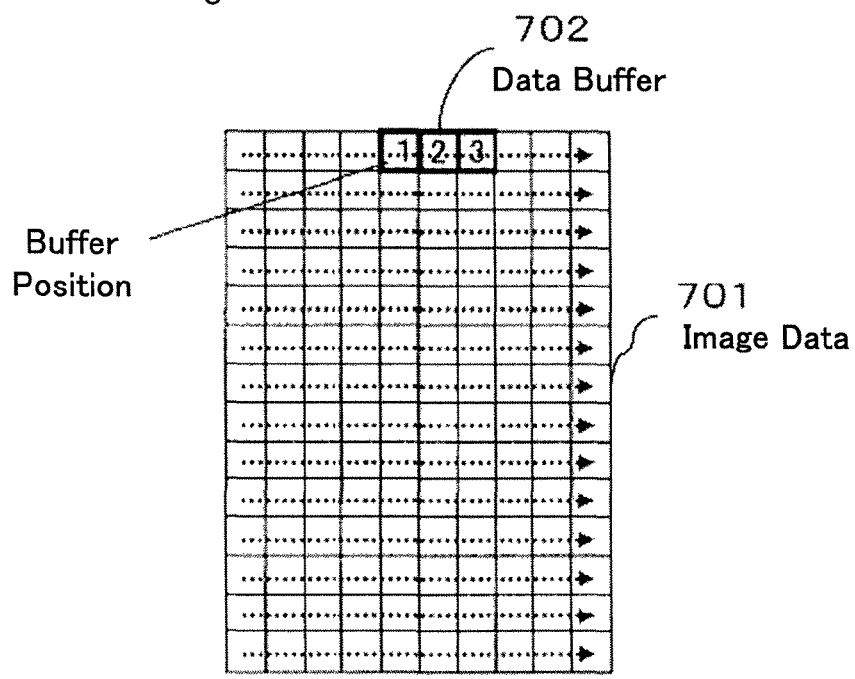

| Index | Buffer Position |
|---|---|
| 1 | 5 |
| 2 | 5 and 1 |
| 3 | 5 and 2 |
| ... | ... |
| 30 | 5 and 41 |
| 31 | 5 and 42 |

801 Gradient Direction Image Data
802 Data Buffer
Attention Pixel

US 8,428,353 B2

CALCULATION APPARATUS FOR AMOUNT OF CHARACTERISTIC AND DISCRIMINATION APPARATUS

CROSS REFERENCE TO RELATED APPLICATION

The present application is related to, claims priority from and incorporates by reference Japanese patent application No. 2010-196982, filed on Sep. 2, 2010.

FIELD

The present embodiment relates to an apparatus for calculating amounts of characteristic based on histograms of data of process targets and to an apparatus for discriminating the data of the process targets.

BACKGROUND

A technology which uses amounts of characteristic based on histograms (frequency value distributions) of data (image, audio, etc.) of process targets as elements is utilized for class discrimination, detection of specific parts or the like of the data of the process targets.

Recently, random access to a memory has been used for a vote process to each bin (category) for calculating a histogram. With such a vote process, it has been difficult to achieve rapid calculation because the vote process cannot be performed in parallel. A technology which divides a memory into a plurality of banks and performs a mapping between the bins of a histogram and memory addresses has been developed. With this technology, parallel calculation units respectively access separate banks to enable histograms to be determined by a parallel process. However, in the above-described technology, since a mapping between the bins of the histogram and a memory space is fixed, the efficiencies of the memory space and the parallelization decrease and a process speed decreases.

One of the subjects to be solved by the present invention is to calculate amounts of characteristic efficiently using parallelization of memories.

BRIEF DESCRIPTION OF THE DRAWINGS

FIG. 6A is a diagram illustrating an example of a structure of a data buffer to determine luminance value histograms of images. FIG. 6B is a diagram illustrating an example of a structure of position data to determine luminance value histograms of images. FIG. 6C is a diagram illustrating an example of a table to determine luminance value histograms of images.

FIG. 7A is a diagram illustrating an example of a structure of a data buffer to determine luminance value histograms of images. FIG. 7B is a diagram illustrating an example of position data to determine luminance value histograms of images. FIG. 7C is a diagram illustrating an example of a table to determine luminance value histograms of images.

DETAILED DESCRIPTION OF EMBODIMENTS

Description regarding embodiments of the present invention will be given. Note, the same reference numbers are assigned to configurations and processes for similar operations, and duplicate explanation will be omitted.

(First Embodiment)

A calculation apparatus for amount of characteristic 110 of the present embodiment calculates an amount of characteristic, which uses a predetermined histogram of input data of a process target as an element. The histogram is a type of data analysis that illustrates frequency value distribution in which a frequency (the number of data or amount of data) of each category (bin) is shown with respect to an amount of characteristic of input data of a process target. An amount of characteristic to be output may be either integrating frequencies of respective categories of a calculated histogram or integrating combination values of frequencies of specific categories of calculated histograms, etc. In the present embodiment, an example using image data as input data of a process target is described; however, the present embodiment can be also utilized for calculating an amount of histogram characteristic of audio data or the like. Note, any value can be an amount of characteristic that is a target for calculating a histogram as long as the value shows a feature of process target, such as, for example, a pixel value, a pixel value gradient or the like as will be described below in detail. In the present embodiment, an example where the calculation apparatus for amount of characteristic 110 is installed in a personal computer or the like is described.

Figure 1:
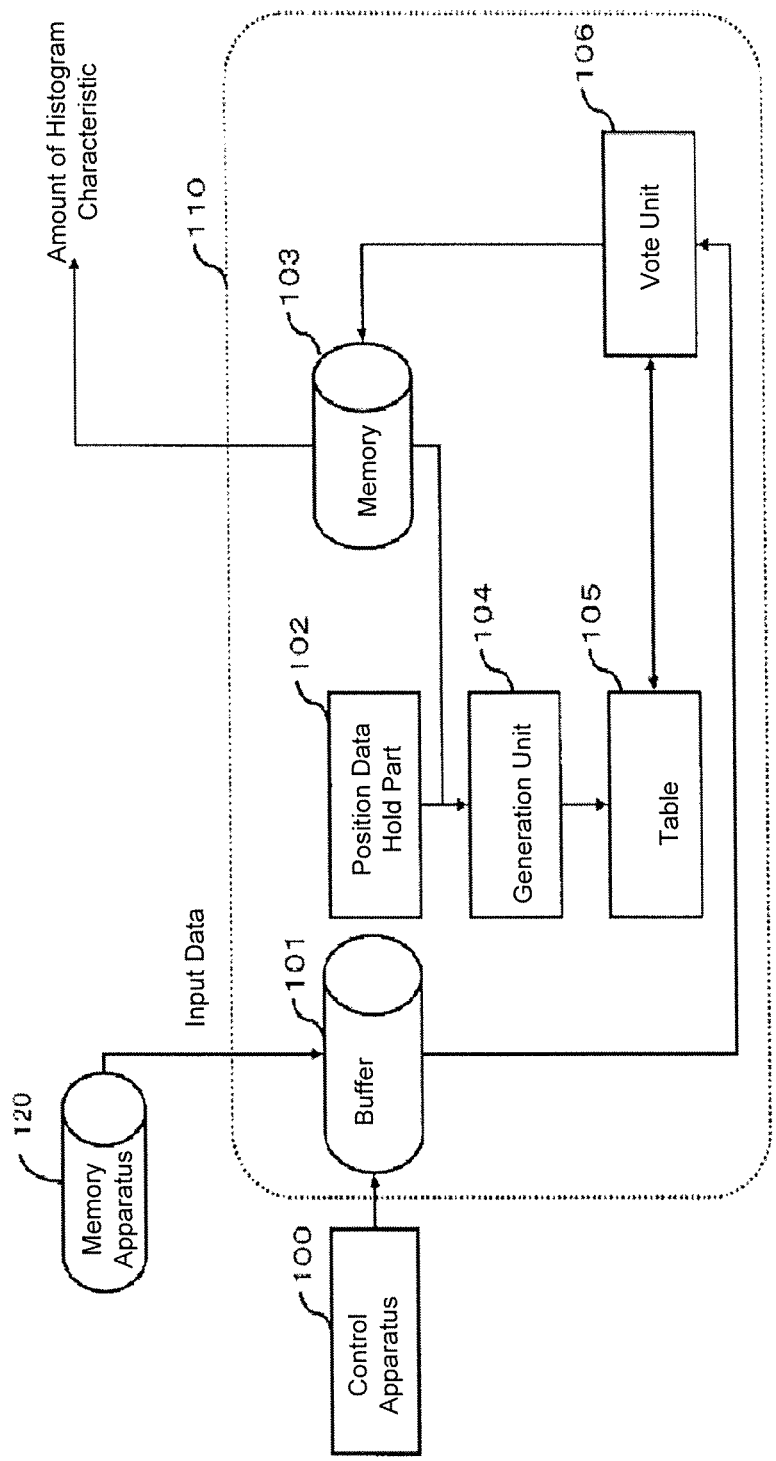
FIG. 1 is a block diagram illustrating a calculation apparatus for amount of characteristic according to a first embodiment.

FIG. 1 is a block diagram of the calculation apparatus for amount of characteristic 110. Outside the calculation apparatus for amount of characteristic 110, a memory apparatus 120 that holds input data of a process target, and a control apparatus 100 that instructs a buffer 101 of the calculation apparatus for amount of characteristic 110 to write and delete data are provided. The control apparatus 100 instructs the buffer 101 to delete the data when a calculation process of an amount of histogram characteristic of data that the buffer 101 holds is finished, and the control apparatus 100 sends a portion of input data that the memory apparatus 120 holds to the buffer 101 when the deletion is completed.

The calculation apparatus for amount of characteristic 110 is provided with the buffer 101 that holds a portion of input data, a position data hold part 102 that memorizes a position on the buffer 101 of which an amount of characteristic is to be calculated, a memory 103 that has a plurality of banks and holds calculation results of histograms, a generation unit 104 that generates a table 105 in which a position on the buffer 101 of which an amount of characteristic is to be calculated corresponds to a position on the memory 103 to which the calculated amount of characteristic is voted, and a vote unit 106 that calculates an amount of characteristic of data to be a target and performs a vote to the position on the memory shown on the table according to a category of the calculated amount of characteristic. In the memory 103, a maximum number N, which is the number of banks that can be accessed separately and in parallel, is set. N is referred to as a parallel number of the memory 103.

Figure 2:
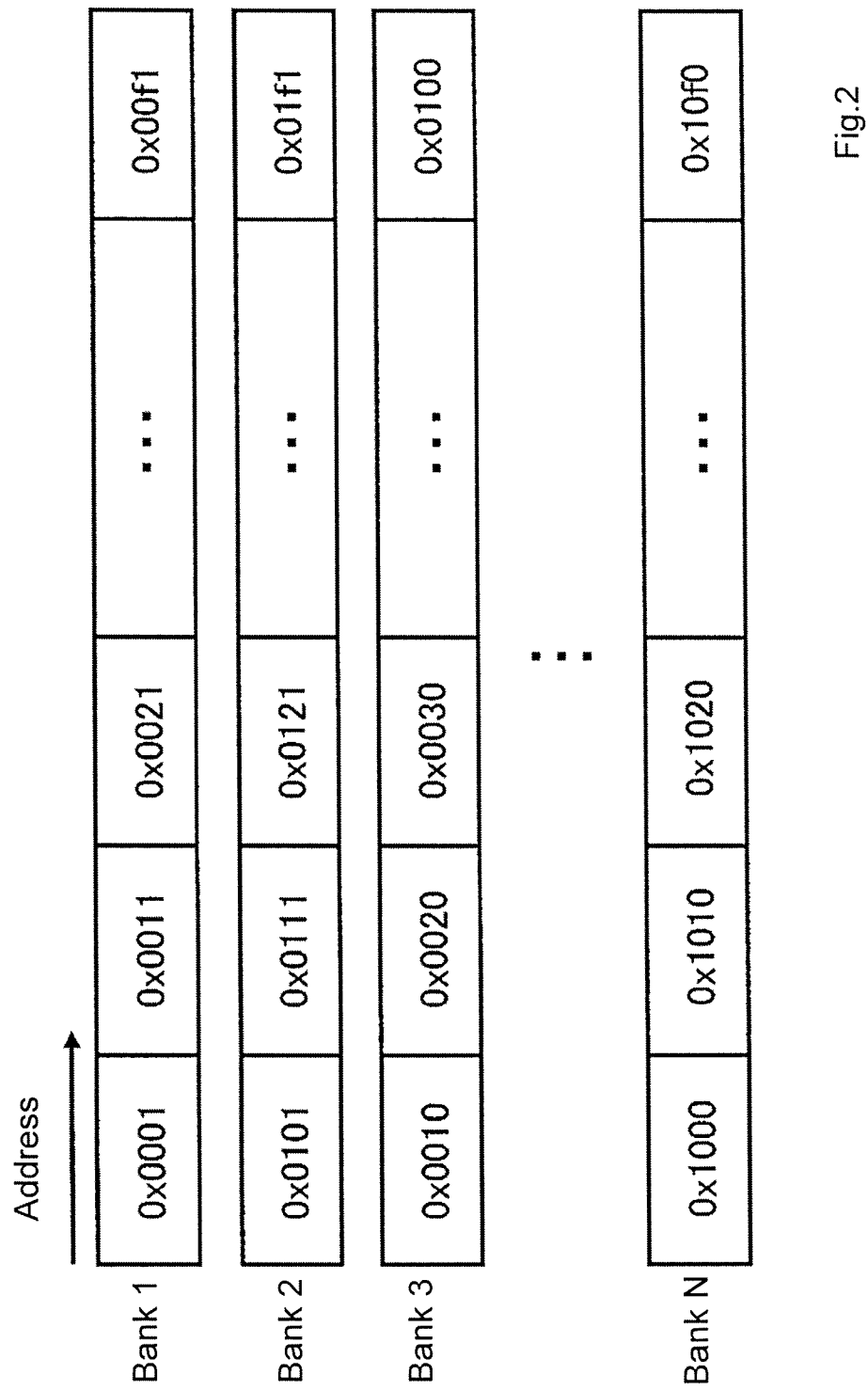
FIG. 2 is a diagram illustrating one example of a memory 103.

FIG. 2 is a diagram illustrating one example of the memory 103. In the example of FIG. 2, the memory 103 has a plurality (N) of banks (units). Since each bank can be accessed separately, the parallel number equals the number of banks When the vote process to the memory 103 is performed in parallel, the process for calculating an amount of histogram characteristic can be accelerated. The generation unit 104 preferably determines memory addresses of vote destinations such that number of processes performed in parallel becomes close to the parallel number N of the memory 103 to the extent possible.

Figure 3:
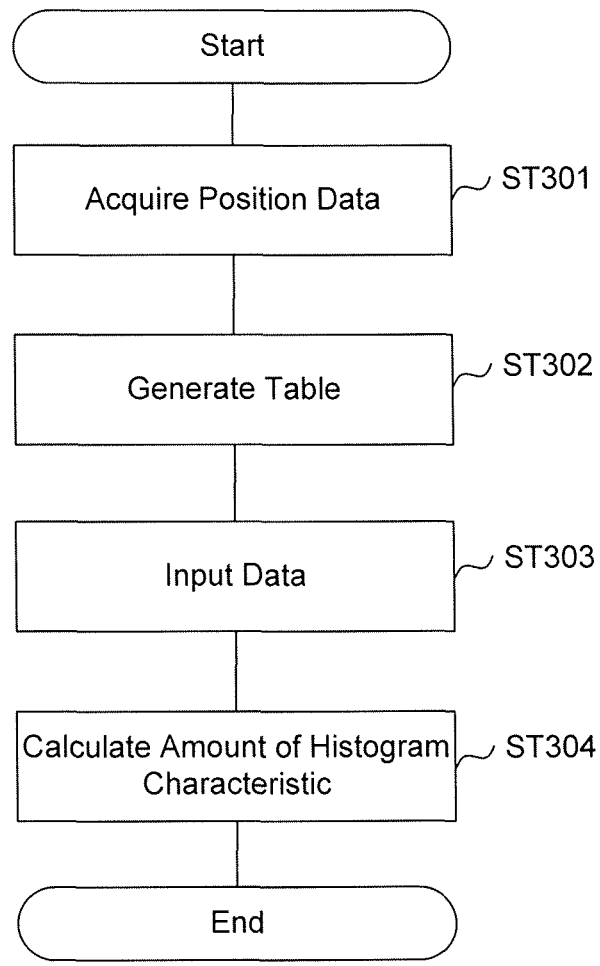
FIG. 3 is a flow diagram illustrating operations of the calculation apparatus for amount of characteristic according to the first embodiment.

FIG. 3 is a flow diagram illustrating operations of the calculation apparatus for amount of characteristic according to the present embodiment.

The generation unit 104 acquires position data that the position data hold part 102 shows (ST301). The generation unit generates the table 105 based on the acquired position data (ST302). The control apparatus 100 transfers a portion of input data to the buffer (ST303). The vote unit 106 determines an amount of characteristic, performs a vote to the bins of the memory 103 based on the amount of characteristic, and calculates an amount of histogram characteristic (ST304).

Figure 4:
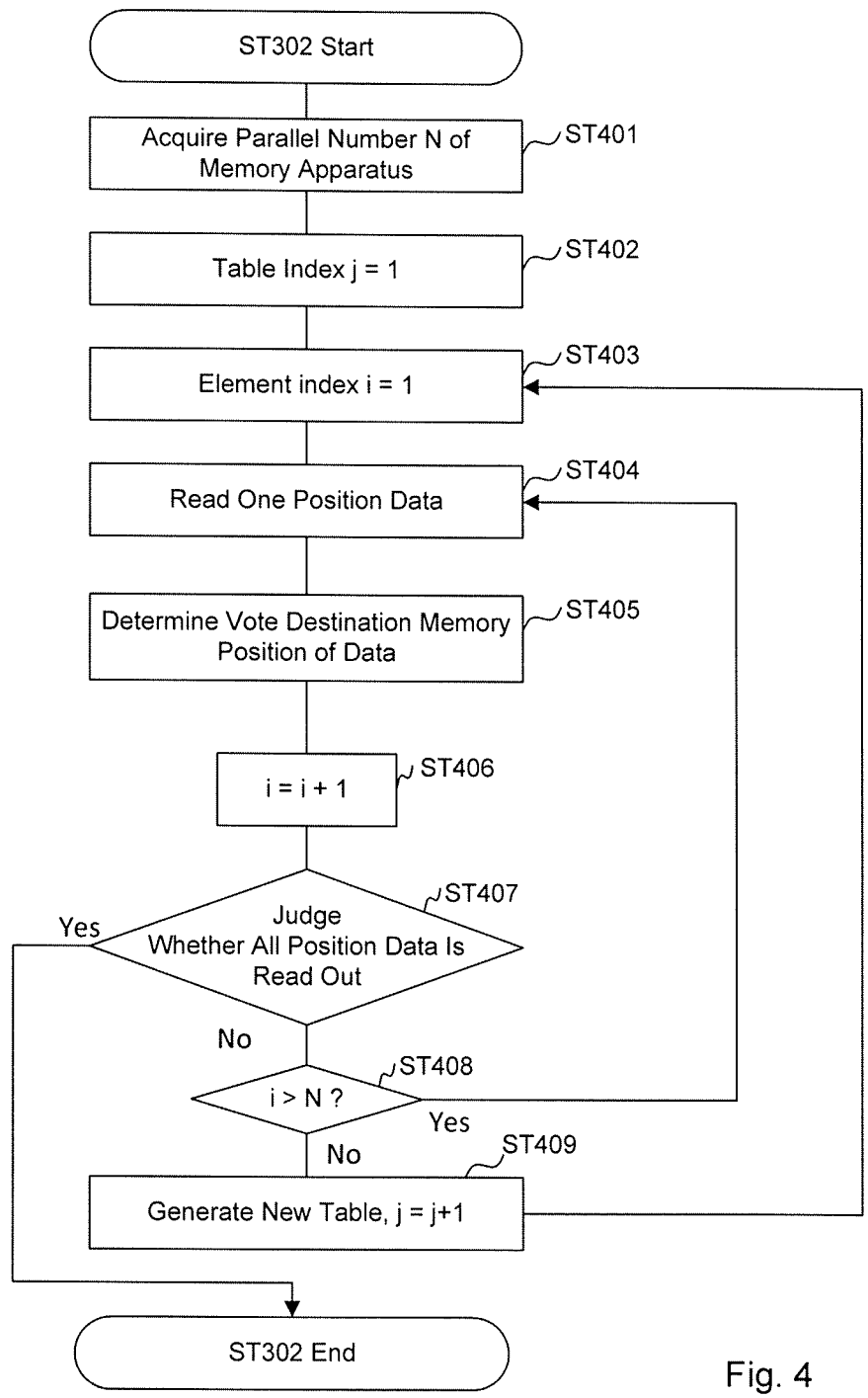
FIG. 4 is a flow diagram illustrating operations for generating a table according to the first embodiment.

FIG. 4 is a flow diagram illustrating the detail of operations of ST302, which is performed by the generation unit 104. The generation unit 104 acquires parallel number N of the memory 103 (ST401). Since the parallel number is a unique value of the memory 103, it is unnecessary to inquire to the memory 103 each time. It is also possible to acquire the parallel number by writing and storing the value in a read only memory (ROM, not illustrated) or by writing and storing the value in a program of the generation unit 104 as a fixed value. The generation unit 104 initializes an index j of the table 106 (table index in FIG. 4) to one (ST402). The generation unit 104 can generate a plurality of the tables. The generation unit 104 initializes an index i of an element (element index in FIG. 4) of each table to one (ST403). The generation unit 104 reads one of position data (hereinafter, referred to as a position data) from the position data hold part 102 (ST404). The position data indicates a position on the buffer where target data of which an amount of characteristic is to be calculated is memorized. The generation unit 104 determines a vote destination memory position of data has been read out (ST405). In the configuration of the memory 103 as illustrated in FIG. 2, the memory position indicates a head address of a memory block in which one histogram data is stored. The memory position can be represented with an ID number B of a memory bank and an address A in the bank. A histogram to which a vote is performed is determined when the memory position is determined, and a bin of the histogram to which a vote is performed is determined according to an amount of characteristic of data. Regarding a set (B, A) of the memory position, memory banks of vote destinations included in one table need to be totally different. This is because the memory banks of the vote destinations need to be totally different in order to perform vote processes simultaneously and in parallel. The easiest way to achieve this is to start the process of ST405 with B=1 and increment. Regarding the address, it is easy to assign sequentially from a smallest address of each bank. Needless to say, any method can be used as long as a digit sequence, which includes either one of 1 to N, is assigned and the same digit is not assigned when the assignment process is repeated N times. For example, another method that simultaneously increments the address and increments the ID of the bank can be used. Also, it is possible to achieve an assignment of address by starting with an address having the largest number and decrementing. A memory position that is determined as described above and a position of data to be read from the buffer 101 are written in an element i of a table j of the table 105. Then, an index i of the table element is incremented (ST406). It is judged whether all position data is read out (ST407). When all position data is read and written to the tables, the process proceeds to ST 410 and the process is finished. Otherwise, it proceeds to ST 408. It is judged whether element number i written in the table j exceeds over the parallel number N (ST408). When the condition of ST408 is satisfied, the table has the banks 1 to N, which appear one time each; thereby, further parallel process is impossible to perform. Then, a new table is generated to which a correspondence between one position data and a memory position of a vote destination is added (ST409). From the above-described processes, a correspondence relationship between a position of the buffer from which data is read and a position of the memory to which the read data is voted when the histogram is calculated is determined. Furthermore, the memory positions of the vote destination written in one table have different banks, so that the vote processes written in one table are possible to execute in parallel. In the method of generating the table, which is described herein, when the number of the position data exceeds the parallel number N, an element number of a first table is always set N, and the remaining elements are assigned to the following tables. The element numbers are not necessarily divided evenly with this process. Namely, there might be remaining elements after the process. Therefore, another way for the assignment is to set the number of elements of the position data to M, determine a minimum integer, which is no less than M/N, calculate number of the tables beforehand, and assign M/K (round up or round down when there are remaining elements) elements to each table. With this way, the tables can be generated only with a different switch condition of the table at ST408. As long as number of the elements is N or less and each of the vote destination memory position has a different bank, other methods for generating the tables can be applicable.

Figure 5:
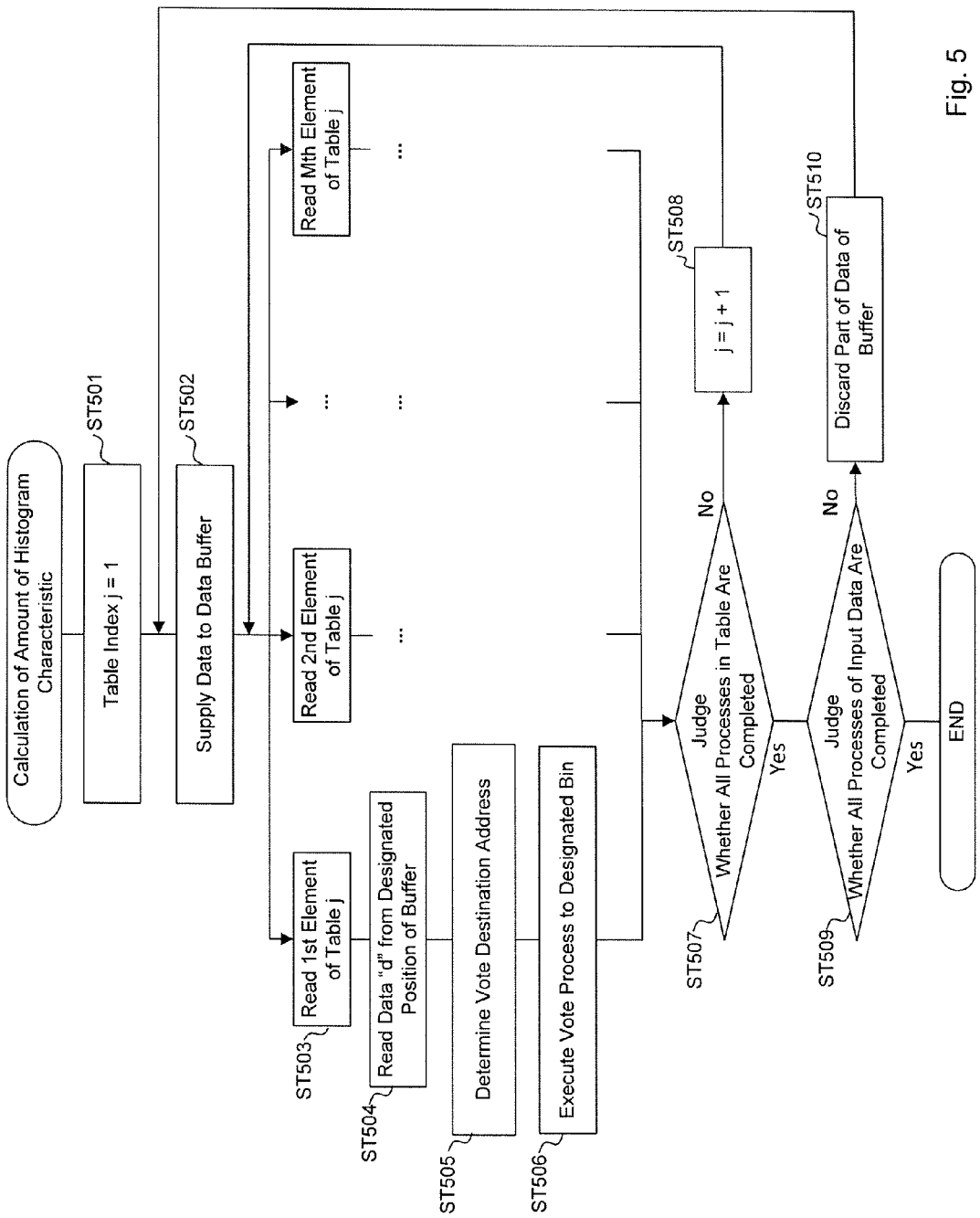
FIG. 5 is a flow diagram illustrating operations for calculating an amount of histogram characteristic according to the first embodiment.

FIG. 5 is a flow diagram illustrating the detail of processes of ST304, which is performed by the vote unit 106. The index j of the table is initialized to one (ST501). The control apparatus 100 supplies data to the buffer 101 (ST502). Any data can be read herein as long as the data is a data sequence, for which a histogram can be calculated, such as luminance value of image data, a quantized value of a luminance value, audio data, other digit sequences, or the like. Read source is not particularly limited to a RAM part, a disk part, flash memory or the like as well. Since it is impossible to read multiple data out at one time from these read sources, data is partially read out and the data is temporarily stored in the buffer 101. The buffer 101 is configured with a register, for example, and has a specification in which all data in the buffer can be read out in parallel. The processes from ST503 to 506 are executed simultaneously and in parallel.

The vote unit 106 reads the correspondence of the position of the buffer to read out and the memory position of the vote destination from the table 105 (ST503). Indices of the table 105 to be read vary according to execution units of M, which are executed in parallel. The vote unit 106 reads data d from the designated position of the buffer 101 (ST504). Based on the set (B, A) of the memory bank ID and the address written to the table 105 and the above-described data d, an address of a bin of the vote destination is determined (ST505). One histogram is stored in each memory space designated by the set (B, A), and a bin to vote is determined by the data d. An amount of histogram characteristic to be calculated in the present embodiment is obtained by integrating several histograms. The vote unit 106 executes the vote process to the designated bin of the histogram (ST506). In other words, a process is performed, in which the data in the designated bin is read out from the memory; the value is incremented; and the data is written in the original memory position. At this time, it is also possible to add another designated value without simply adding one to a value of the bin. With the above-described processes, the M vote processes are executed in parallel.

A check is performed if a not-calculated table remains (ST507 and 508). When the not-calculated table remains, the parallel vote process from ST 503 is repeated. When the process for all tables is completed, the process proceeds to ST509 and a check is performed if the process of all data is completed. When the data remains, the control device 100 discards partial data in the buffer at ST 510, and new data is read to the buffer (ST501 and 502). When the process of all data is completed, the process proceeds to ST511 and the entire process is finished. An amount of histogram characteristic is obtained by integrating all selected histograms.

Next, the detail calculation process is explained with several examples. First, a simple example is given which has image data 601 of FIG. 6A as input data. In the example, the buffer 101 reads only a luminance value having one pixel such as a data buffer 602, and a luminance histogram of an entire image is calculated. This is a typical process as a preprocess for correcting the luminance of an image. In this case, since the buffer 101 can hold only one pixel at one time, only one data is described in the position data as illustrated in FIG. 6B. This explains a situation where the position 1 (only luminance data that is held) of the buffer 101 is read to use as a bin. The table 105, which is generated from the above-described data, has only one element as illustrated in FIG. 6C. In other words, the luminance value, which has been read, is used as a bin, and the entire vote process is performed to one histogram. In this example, only one pixel can be read at one time. Therefore, even when the memory 103 is configured with a plurality of banks, only a single vote process can be performed at one time. When the vote process is completed, the data in the buffer 101 is discarded and a following pixel is read in raster scan order.

Next, an example is given in which a luminance histogram is calculated using a buffer 101 that can read luminance values of a plurality of pixels as illustrated in FIG. 7A. In this case, position data is designated as FIG. 7B, and a table is generated as FIG. 7C. Therefore, in this example, the calculation can be performed while vote processes for three pixels are performed in parallel. An amount of histogram characteristic, which is obtained from the above-described process, includes three histograms that are arranged in parallel with respect to one image data. Accordingly, it needs to add the values of the histograms in order to obtain the luminance histogram of the entire image. A required calculation amount for the calculation is proportional to the number of bins; however, the number of bins for most images is 256, which is significantly small compared to the number of pixels of a target image. Therefore, an improvement of calculation efficiency by the parallelization of pixels is significant. In the example, the three pixels that have been read are discarded at ST510, and then the following three pixels are read in raster scan order. In this example, the example of the buffer that reads three pixels is given; however, the number of the execution in parallel increases when a buffer size is increased with an upper limit of the parallel number N of the memory. When the buffer size exceeds N, the number of tables becomes plural, and vote processes are executed by diving into the number of the tables. Accordingly, depending on a method of generating the tables, a parallel degree can be automatically adjusted in correspondence to the number (buffer size) of pixels that can be read at one time or the number of the memories to store the histograms.

Further, for another embodiment, an example is given regarding a histogram amount based on a combination of gradient directions. An amount of CoHOG characteristic, which is proposed in "T. Watanabe, S. Ito, and K. Yokoi, "Co-occurrence histograms of oriented gradients for pedestrian detection," in PSIVT, 2009, pp. 37-47," is an image amount of characteristic that is obtained by calculating gradient directions of each pixel as an amount of characteristic and integrating (or arranging) histograms using a combination of gradient directions of an attention pixel and vicinity pixels as a bin. Furthermore, not by calculating one histogram corresponding to the entire target region, but by dividing an entire target region into several blocks and calculating a histogram of each block, it becomes possible to represent each of features corresponding to regions.

Figures 8A, 8B:
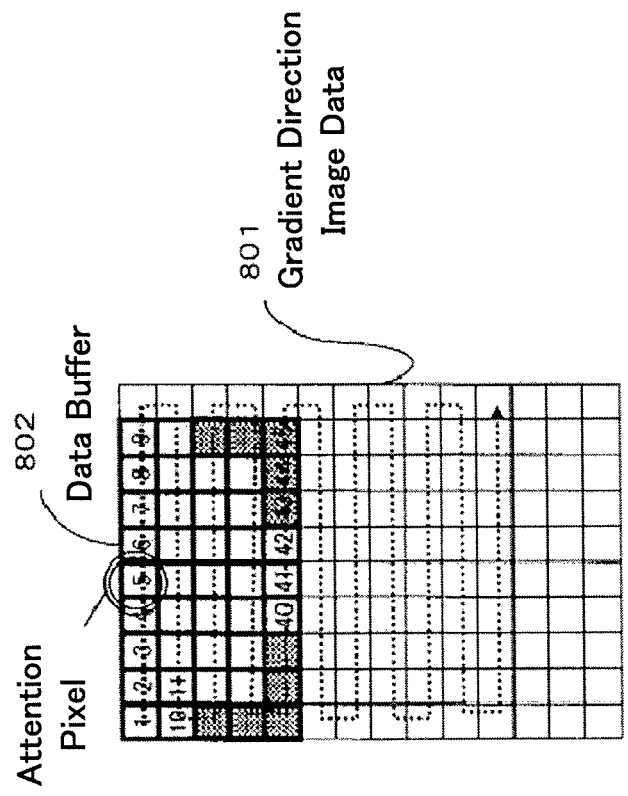
FIG. 8A is a diagram illustrating an example of a structure of a data buffer to calculate amounts of CoHOG characteristic of luminance gradient.
FIG. 8B is a diagram illustrating an example of position data to calculate amounts of CoHOG characteristic of luminance gradient.

Such an amount of characteristic is also a calculation target of the calculation apparatus for amount of characteristic of the present embodiment. Input data for calculating the amount of CoHOG characteristic is a luminance gradient image, and has a pixel value obtained by quantizing gradient directions of each pixel from an original image. A buffer 101 is a rectangular shape having a width of nine pixels and a height of five pixels as illustrated in FIG. 8A. The amount of CoHOG characteristic is obtained when a single histogram of a gradient direction of an attention pixel (fifth pixel) and histograms of combinations of gradient directions of the attention pixel and the vicinity pixels are calculated from the buffer and are integrated. A histogram for each positional relation of a pixel to be read is generated. FIG. 8B illustrates position data of the amount of CoHOG characteristic. Histograms are respectively generated with respect to gradient direction pairs of the gradient directions only of the attention pixels and 30 pairs of vicinity pixels. As in the above-described example, with respect to the position data, a table can be generated corresponding to a parallel number of the memory. When the parallel number is 31 or more, the histograms only for the attention pixel and for the combinations can be calculated at one time in parallel. When the parallel number is less than 31, a plurality of tables is generated, and the vote processes are executed by dividing into the number of the tables. In the case of the amount of CoHOG characteristic, since each block in the target region has a different vote destination, a table group for each block is prepared beforehand. When a block to which pixels being read belong is shifted, it is able to process by switching the table group. Regarding data supply to the buffer 101, when having attention data moved in a zigzag traveling path on the target region, data amount to be added to the buffer is maintained small so that the efficiency is improved. For the zigzag traveling path, for example, first, traveling from an upper-left of the target region in a right-hand direction, going down by one pixel after reaching the right end, and traveling in a left-hand direction.

Figure 9:
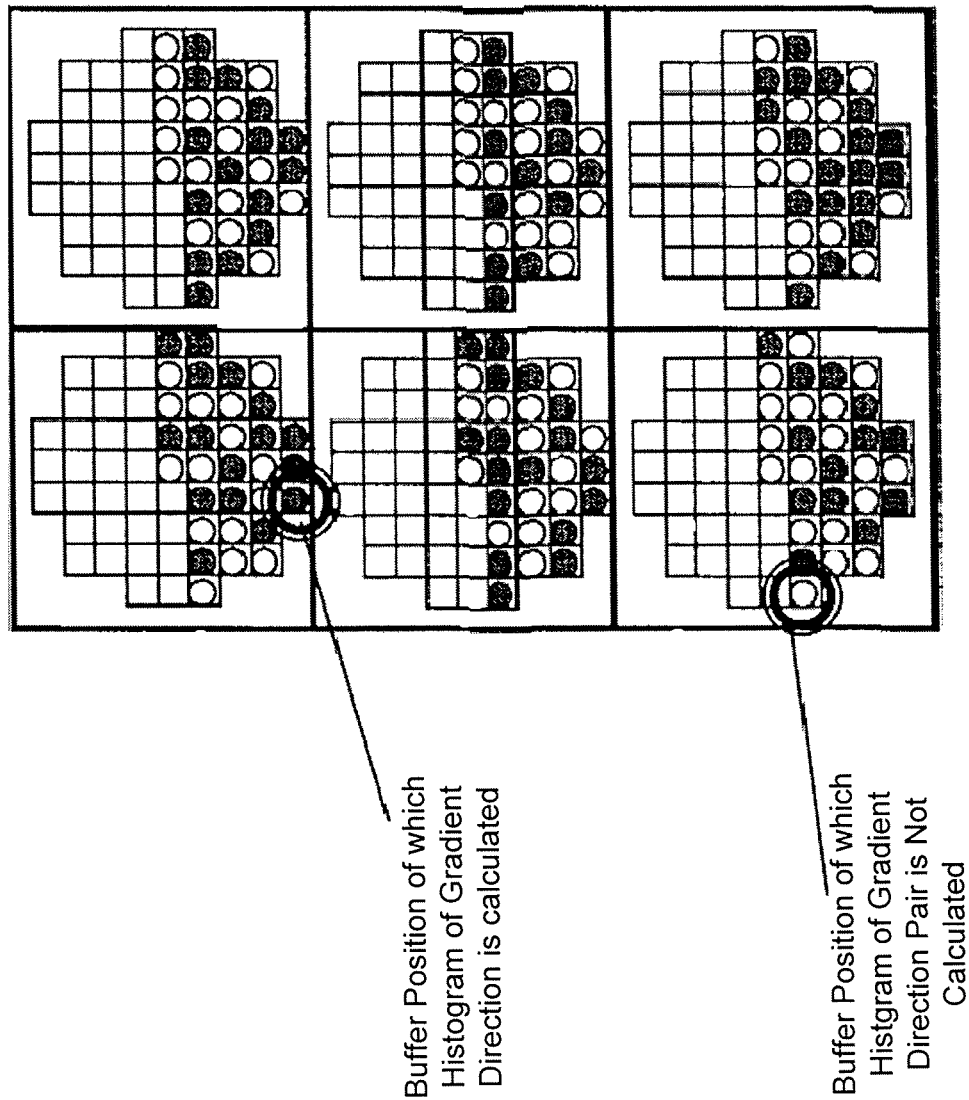
FIG. 9 is a diagram illustrating an example of a subset of gradient direction pairs of amounts of CoHOG characteristic calculation.

Since the amount of CoHOG characteristic is calculated from an integrated histogram of a large number of combination histograms, the number of elements becomes extremely large. Therefore, not by calculating the histograms of all pairs of gradient directions, but by using the subset of the histograms, the number of elements of the amount of characteristic can be reduced. At this time, each block can use a different subset as illustrated in FIG. 9 without using the same subset at all blocks in the target region. The amount of CoHOG characteristic is used for discrimination issue in judging a class (pedestrians, cars, signs, etc.) for an image to be categorized. In the issue, each class has important parts and unimportant parts for the judgment. When each block adopts a different subset of the gradient direction pairs, number of the pairs of calculated histograms increases in the important parts, and number of the pairs of calculated histograms decreases in the unimportant parts. Thereby, an adjustment for maintaining the discrimination performance simultaneously with reducing the element number of entire amount of characteristic can be performed. With the calculation apparatus for amount of characteristic of the present embodiment, such a process can be realized. All of the gradient direction pairs can be represented by the position data in FIG. 8B, and thereby portions of FIG. 8B are extracted when its subset is used. When each block has a different designated data, the number of the gradient direction pairs can be adjusted by parts. Important parts for the judgment vary depending on classes to be a target, and therefore, the gradient direction pair that is used for the amount of characteristic calculation varies depending on the classes. Since the present embodiment has a mechanism that calculates the tables dynamically, even when the class to be a target is switched in the middle, the combination of parallel calculations can be changed corresponding to the switch. Therefore, even when a position of data of which a histogram is calculated varies depending on portions, and even when the number of histograms varies according to circumstances, the parallel process can be realized corresponding to respective conditions. Therefore, a amount of histogram characteristic can be rapidly calculated corresponding to the respective conditions.

In the calculation apparatus for amount of characteristic of the first embodiment, an area in which the vote process is executed in parallel is determined using spec information such as the size of the buffer 101, the calculation position of the histogram, and the parallel degree of the memory 103, and the amount of characteristics are calculated in parallel. Since the determination is dynamically performed, it is possible to vary the parallel degree according to the variation of the specs.

(Second Embodiment)

A description regarding operations of a discrimination apparatus 1110 of a second embodiment is given. Histograms are not explicitly determined from input data. An inner product of a discrimination function shown by dictionary data as an amount of histogram characteristic and value of each bin of a histogram is calculated, which is a different point from the calculation apparatus for amount of characteristic of the first embodiment.

Figure 10:
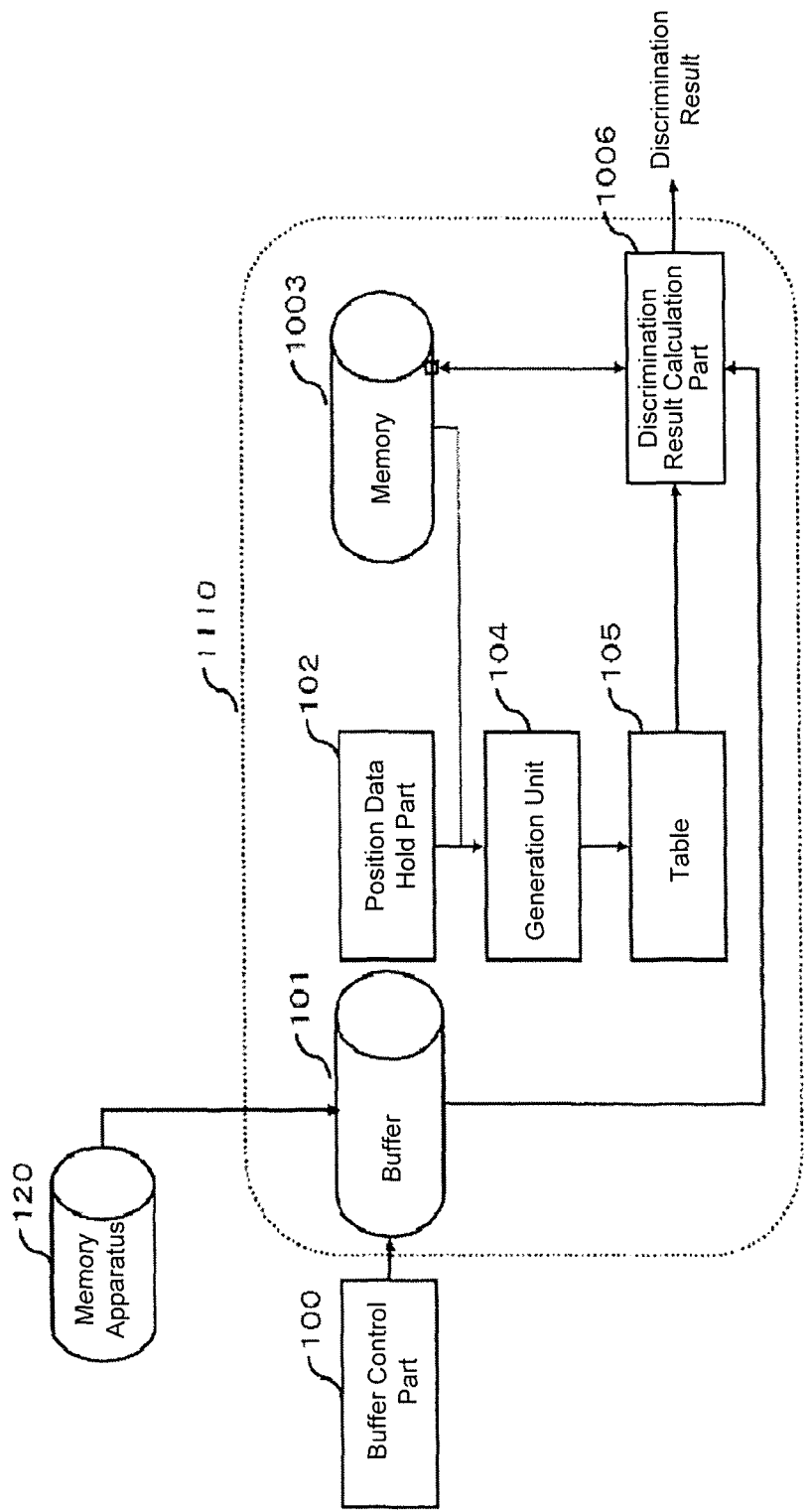
FIG. 10 is a block diagram illustrating a discrimination apparatus according to a second embodiment.

FIG. 10 is a block diagram of the discrimination apparatus of the present embodiment. The second embodiment has at least two different points from the first embodiments as follows. Memory 1003 is used for holding a weight coefficient (also referred to as dictionary data) of a linear discrimination function corresponding to histogram data without storing the histogram data. A discrimination result calculation part 1006 is used for calculating an inner product value g(x) of a amount of histogram characteristic and the weight coefficient stored in the memory 1003. The inner product value g(x) is calculated with a following formula:

$$g(x) = w1 \cdot x1 + w2 \cdot x2 + w2 \cdot x2 + \ldots + wN \cdot xN + b \quad (1).$$

Figure 11:
FIG. 11 is a flow diagram illustrating operations according to the second embodiment (discrimination function calculation part).

Herein, x1, x2, ... xN are elements of an amount of histogram characteristic, w1, w2, ... wN are weight coefficient corresponding thereto, and b is a scalar constant. The values of w1, w2, ... wN and b are calculated by a learning technique such as linear support vector machine (SVM) beforehand. It is possible to judge if an input amount of histogram characteristic belongs to a specific category or not by a sign of the inner product value g(x). The discrimination apparatus 1100 can output either the inner product value or the sign. The calculation part 1006 for calculating the inner product value has a register that holds a progress of a function value and an adder inside. As in the first embodiment, the processes in the present embodiment can be broadly divided into the process for calculating the tables and the other following process. The different point is the reduction of output data amount due to the output only of the inner product value, which is not an amount of characteristic. In the case of the above-described amount of CoHOG characteristic, the output data size increases because the element number is large; however, such an issue can be solved in the present embodiment because the number of the scalar value is only one. The process for calculating the tables is similar to FIG. 4, which is a flow diagram according to the first embodiment. A combination of a position of calculating a histogram in the buffer 101 and a parallel operation corresponding to the parallel degree of the memory 1003 is determined. An amount of histogram characteristic is calculated using the obtained table, and FIG. 11 is a flow diagram illustrating the processes for calculating the inner product value. At ST1101, the inner product value is initialized to zero. At ST1102, which is the next, the index of the table is initialized. At ST1103, a process for reading input data to the buffer 101 is performed. The data to be read is not limited to image data, which is used for the explanation, and the same method can be applied to any digit sequence as long as a histogram can be calculated. Processes from ST1104 to ST1107 can be processed in parallel. At ST1104, one element is read from the table, and a data position of which a histogram is calculated and a memory position in which a weight coefficient corresponding thereto is stored are acquired. The memory position is given with a set (B, A) of a memory bank ID and an address. At ST1105, data d is read from the designated buffer position. When two combinations of data are used as the amount of CoHOG characteristic, both two data are read. At ST1106, a memory position (B, A) of the weight coefficient and a memory address of the weight coefficient from the data d are determined. The processes so far are not particularly different from the flow diagram of FIG. 5. A process at ST1107 has a different point, and a value of the determined memory address is read out and added to the inner product value instead of incrementing the value of determined memory address and performing a vote. xi of one term wixi of the formula (1) is a value of a histogram. Therefore, herein, a process for obtaining the value of wixi by adding wi for xi times is performed without determining wi and xi separately and multiplying them. When there is a plurality of tables, this parallel process is repeated for number of the tables. Furthermore, by repeating this process over whole input data, the inner product value is calculated and output. Compared to the process illustrated in FIG. 5, in the above-described process, the vote process to the memory 103 is replaced with the reading and adding of the weight coefficient. Therefore, as in the first embodiment, the present embodiment has the effect that can realize the parallelization corresponding to the combination of the buffer position of which a histogram is calculated and the parallel number of the memory 1003. Furthermore, in the present embodiment, by arranging several types of dictionary data in the different memory spaces, it becomes possible to perform the parallel calculation of the linear discrimination function. When an amount of CoHOG characteristic of which elements are reduced is considered as an example, 13 sets of gradient direction pairs for discriminating class A and 7 sets for discriminating B are used in a block. Then, when there are two or more discrimination result calculation parts and when the memory parallel number is 20 or more, two dictionary data can be called in parallel and two adding can be executed in parallel. On the other hand, when the parallel number is 19 or less, the parallelization corresponding to the size of the part can be realized as processing two times or the like, which is the common effect to the first embodiment.

A number of embodiments of the present invention have been explained. However, these embodiments are provided as examples but not provided to limit a scope of the invention. These new embodiments are allowed to execute in other varieties of embodiments, and can be partially deleted, replaced or modified without departing from the scope of the invention. These embodiments and its modification are included in the invention claimed in the scope of claiming and the scope of equivalent as well as in the scope of the invention and its scope.

What is claimed is:

1. A calculation apparatus for amount of characteristic that calculates an amount of characteristic based on a histogram of an amount of characteristic of input data, comprising:
   a buffer for holding a portion of the input data;
   a memory, having a plurality of banks, for holding calculation results of the histogram;
   a generation unit configured to generate a table in which a position of a target data on the buffer of which the amount of characteristic is to be calculated corresponds to a position on the memory to which a category of the calculated amount of characteristic is voted; and
   a vote unit configured to determine a category of the amount of characteristic of the target data and perform a vote to the position on the memory shown on the table.

2. The calculation apparatus for amount of characteristic according to claim 1, wherein
   the memory has N banks, and
   when a table to which N or less combinations correspond is generated, the generation unit generates the table in which each position on the memory, to which the vote is performed, belongs to a different bank for all possible combinations.

3. The calculation apparatus for amount of characteristic according to claim 2, wherein
   the generation unit generates a number of tables corresponding to a number of elements of the input data that the buffer holds, and
   the vote unit performs a vote to each of the tables in parallel.

4. The calculation apparatus for amount of characteristic according to claim 1, wherein
   the generation unit generates a plurality of the tables, and
   the vote unit selects the table to refer according to a position of the target data in the input data and performs a vote according to the selected table.

5. The calculation apparatus for amount of characteristic according to claim 4, wherein
   the input data is image data, and
   the vote unit determines the category based on a pixel value gradient of the image data.

6. A discrimination apparatus that discriminates a class of input data, comprising:
   a buffer for holding a portion of the input data;
   a memory, having a plurality of banks, for holding calculation results of a histogram;
   a generation unit configured to generate a table in which a position of a target data on the buffer of which an amount of characteristic is to be calculated corresponds to a position on the memory to which a weight coefficient corresponding to a category of the calculated amount of characteristic is added;
   a vote unit configured to determine the amount of characteristic of the target data and adds a value to the weight coefficient of a position on the memory shown on the table corresponding to the category of the determined amount of characteristic; and
   a calculation part that determines a discrimination result from the weight coefficient determined with respect to the input data and the amount of characteristic of each category.

* * * * *